United States Patent
Al Jarri et al.

(10) Patent No.: US 12,547,599 B2
(45) Date of Patent: Feb. 10, 2026

(54) SYSTEM AND METHOD CONFIGURED TO MANAGE INTERNET OF THINGS (IOT) DEVICES USING DIGITAL TWINS AND BLOCKCHAINS

(71) Applicant: SAUDI ARABIAN OIL COMPANY, Dhahran (SA)

(72) Inventors: Johara Abdulrahman Al Jarri, Dammam (SA); Mohammed A Alfraih, Khobar (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/516,602

(22) Filed: Nov. 21, 2023

(65) Prior Publication Data

US 2025/0165448 A1 May 22, 2025

(51) Int. Cl.
*G06F 16/00* (2019.01)
*G06F 16/22* (2019.01)

(52) U.S. Cl.
CPC ................................ *G06F 16/2255* (2019.01)

(58) Field of Classification Search
CPC .................................................. G06F 16/2255
See application file for complete search history.

(56) References Cited

U.S. PATENT DOCUMENTS

| | | | |
|---|---|---|---|
| 10,887,082 B2 * | 1/2021 | Chamarajnager | ... H04L 63/0823 |
| 11,463,322 B1 | 10/2022 | Sha et al. | |
| 11,774,925 B2 * | 10/2023 | Sharma | ................. G05B 15/02 700/44 |
| 2018/0054376 A1 * | 2/2018 | Hershey | ................. H04L 43/067 |
| 2019/0286373 A1 * | 9/2019 | Karumbunathan | ..... G06F 3/067 |
| 2019/0354922 A1 * | 11/2019 | Berti | .................... G06K 7/1417 |
| 2020/0186524 A1 * | 6/2020 | Zhou | ....................... H04W 4/70 |
| 2020/0227178 A1 * | 7/2020 | Lombardi | .............. G06N 20/00 |
| 2020/0235911 A1 * | 7/2020 | Safak | .................... H04L 9/3247 |
| 2020/0295942 A1 * | 9/2020 | Bartolucci | ........... H04L 9/3236 |
| 2021/0081938 A1 * | 3/2021 | Falk | ....................... H04L 9/3247 |
| 2021/0089551 A1 * | 3/2021 | DeLuca | ................. H04L 9/0637 |
| 2021/0096975 A1 * | 4/2021 | DeLuca | .............. G06F 11/3409 |
| 2021/0158242 A1 * | 5/2021 | Berti | ................. G06Q 10/06311 |
| 2021/0158307 A1 * | 5/2021 | DeLuca | ........... G06Q 10/06311 |
| 2021/0160961 A1 * | 5/2021 | DeLuca | ................. H04L 63/123 |
| 2021/0185091 A1 * | 6/2021 | Cage | ................... G06Q 20/3821 |
| 2022/0136665 A1 | 5/2022 | Beth et al. | |
| 2023/0032836 A1 * | 2/2023 | Pabón | ................... G06F 3/0688 |
| 2023/0074164 A1 | 3/2023 | Ghosh et al. | |
| 2023/0259112 A1 | 8/2023 | Cheon et al. | |

(Continued)

*Primary Examiner* — Noosha Arjomandi
(74) *Attorney, Agent, or Firm* — Leason Ellis LLP

(57) ABSTRACT

A system and method manage Internet of Things (IoT) devices using digital twins and blockchains. Each digital twin represents a respective IoT device, and each digital twin is stored in a blockchain. The system communicates with the IoT devices through a network that includes the Internet. The communications between the system and the IoT devices is conducted over a secure communication channel. The system allows a user using a user interface to monitor the digital twin of a particular IoT device and to control the IoT device. The digital twin is updated with a state or a behavior of the corresponding IoT device. The method implements the system.

18 Claims, 5 Drawing Sheets

(56) References Cited

U.S. PATENT DOCUMENTS

| | | | |
|---|---|---|---|
| 2023/0259864 A1* | 8/2023 | Decrop | A61B 5/01 |
| | | | 705/7.41 |
| 2023/0290036 A1 | 9/2023 | Tasse et al. | |
| 2024/0022543 A1* | 1/2024 | Young | H04L 63/18 |
| 2024/0103504 A1* | 3/2024 | Batcher | G05B 19/41885 |
| 2024/0104087 A1* | 3/2024 | Batcher | G06F 16/2379 |
| 2024/0380620 A1* | 11/2024 | Poschke | H04W 12/041 |

* cited by examiner

FIG. 4

- 402: CREATE A DIGITAL TWIN CORRESPONDING TO AN IOT DEVICE
- 404: STORE THE DIGITAL TWIN IN A BLOCKCHAIN
- 406: RECEIVE A CHANGE OF STATE OR BEHAVIOR OF THE IOT DEVICE OVER A SECURE COMMUNICATION CHANNEL
- 408: UPDATE THE CORRESPONDING DIGITAL TWIN WITH INFORMATION ON THE CHANGE IN THE STATE OR BEHAVIOR
- 410: MONITOR THE DIGITAL TWIN USING A USER INTERFACE
- 412: RECEIVE A CONTROL INPUT FROM A USER THROUGH THE USER INTERFACE
- 414: CONTROL THE IOT DEVICE OVER THE SECURE COMMUNICATION CHANNEL USING A CONTROLLER

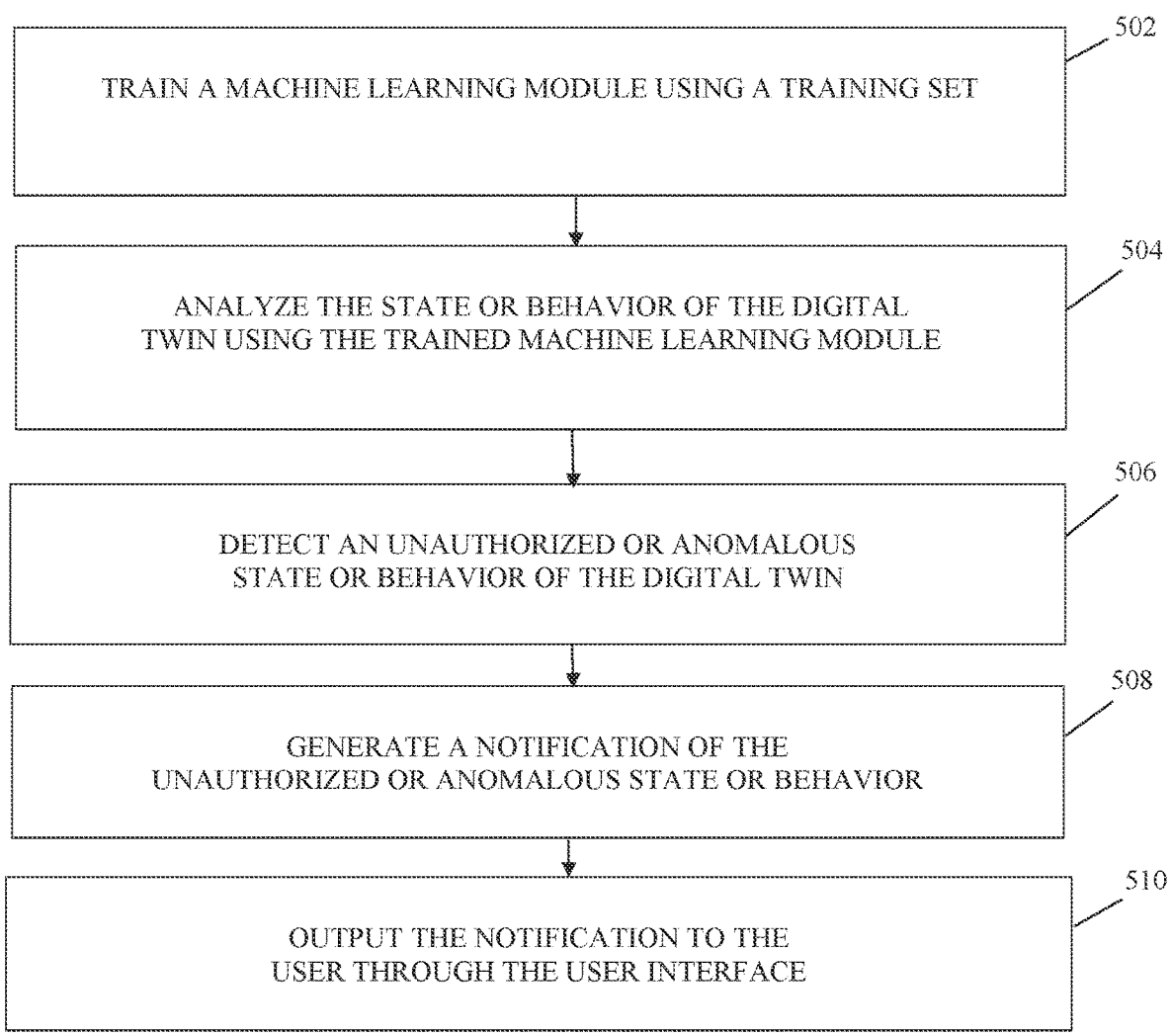

SYSTEM AND METHOD CONFIGURED TO MANAGE INTERNET OF THINGS (IOT) DEVICES USING DIGITAL TWINS AND BLOCKCHAINS

FIELD OF THE DISCLOSURE

The present disclosure relates generally to managing diverse devices, and, more particularly, to a system and method configured to manage Internet of Things (IoT) devices using digital twins and blockchains.

BACKGROUND OF THE DISCLOSURE

Electronic devices are pervasive, and more and more are being interconnected. The Internet of Things (IoT) refers to the growing network of connected devices that are embedded with sensors, software, and communication capabilities that are able to collect, share, and act on data. IoT devices can be found in a wide range of applications and industries, including home automation, industrial control, healthcare, transportation, and more.

As the number and complexity of IoT devices and networks continue to grow, there is a growing need for effective and secure methods of connecting and managing these devices. One challenge in managing IoT devices is ensuring the security and reliability of the communication and data transmission between the devices and the central server or other control systems. Security and reliability can be particularly important in applications in which the IoT devices are responsible for critical functions or in situations in which the data generated by the IoT devices is sensitive or valuable. In addition, when managing large scale IoT deployments, it is difficult or impractical to monitor individual devices in real-time.

SUMMARY OF THE DISCLOSURE

According to an embodiment consistent with the present disclosure, a system and method are configured to manage Internet of Things devices using digital twins and blockchains.

In an embodiment, a system comprises a communication interface, a hardware-based processor, a memory, and a set of modules. The communication interface is operatively connected to a user device associated with a user and having a user interface, and the communication interface is operatively connected to an electronic device through a network, wherein the electronic device is associated with a first characteristic. The memory is configured to store instructions and configured to provide the instructions to the hardware-based processor, wherein the memory includes a blockchain network having a plurality of block devices storing, in a blockchain, a digital twin corresponding to the electronic device, wherein the digital twin includes the first characteristic. The set of modules is configured to implement the instructions provided to the hardware-based processor, and the set of modules includes an update module configured to receive an updated characteristic associated with the electronic device, and to update the digital twin corresponding to the electronic device to include the updated characteristic. The processor, responsive to a user input received from the user through the user interface, performs an action in relation to the digital twin or the corresponding electronic device.

At least one of the first characteristic and the updated characteristic can be a state or a behavior of the electronic device. The digital twin can represent the state or behavior of the electronic device. The action can be a monitoring of the digital twin or a controlling of the electronic device. The electronic device can be an Internet of Things (IoT) device. The communication interface can establish a secure communication channel between the system and the electronic device. The digital twin can include a smart contract operating in relation to the electronic device. The set of modules can further comprise a machine learning module trained by a predetermined training set and, after training, configured to detect an unauthorized or anomalous characteristic of the electronic device from the first characteristic or the current characteristic.

In another embodiment, a system comprises an electronic device, a user device, a network and a management module. The electronic device is associated with a first characteristic including a first state or a first behavior of the electronic device. The user device is associated with a user and includes a user interface. The management module includes a communication interface, a hardware-based processor, a memory, and a set of modules. The communication interface is operatively connected to the electronic device and the user device through the network. The memory is configured to store instructions and is configured to provide the instructions to the hardware-based processor, wherein the memory includes a blockchain network having a plurality of block devices storing, in a blockchain, a digital twin corresponding to the electronic device, wherein the digital twin includes the first characteristic. The set of modules is configured to implement the instructions provided to the hardware-based processor, and the set of modules includes an update module configured to receive an updated characteristic, including an updated state or an updated behavior, and associated with the electronic device, and to update the digital twin corresponding to the electronic device to include the updated characteristic. The processor, responsive to a user input received from the user through the user interface, performs an action in relation to the digital twin or the corresponding electronic device.

The digital twin can represent the first or updated state or the first or updated behavior of the electronic device. The action can be a monitoring of the digital twin or a controlling of the electronic device. The network can include the Internet, and the electronic device is an Internet of Things (IoT) device. The communication interface can establish a secure communication channel between the management module and the electronic device. The digital twin can include a smart contract operating in relation to the electronic device. The set of modules can further comprise a machine learning module trained by a predetermined training set and, after training, configured to detect an unauthorized or anomalous characteristic of the electronic device from the first characteristic or the current characteristic.

In a further embodiment, a computer-implemented method comprises creating a digital twin of an electronic device within a memory of a machine, storing the digital twin in a blockchain, receiving, at the machine, information of a change of a first characteristic of the electronic device, updating the digital twin with the information, and performing an action in relation to the digital twin or the corresponding electronic device. The performing of the action can include monitoring the digital twin using a user interface. Alternatively, the performing of the action can include receiving a control input from a user through a user interface, and responsive to the control input, controlling the electronic device. The electronic device can be an Internet of Things device. The method can further comprise training a machine learning module using a predetermined training set, thereby configuring the trained machine learning module to detect an unauthorized or anomalous characteristic of the electronic device. The method can also further comprise analyzing a first characteristic of the electronic device using the trained machine learning module, detecting the unauthorized or anomalous characteristic of the digital twin, generating a notification of the unauthorized or anomalous characteristic, and outputting the notification to the user through the user interface.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

FIG. 4 is a flowchart of operation of the system of FIG. 1.

FIG. 5 is a flowchart of monitoring for unauthorized or anomalous states or behaviors.

It is noted that the drawings are illustrative and are not necessarily to scale.

DETAILED DESCRIPTION OF CERTAIN EMBODIMENTS OF THE DISCLOSURE

Example embodiments consistent with the teachings included in the present disclosure are directed to a system 100 and method 400 configured to manage Internet of Things devices using digital twins and blockchains.

Figure 1:
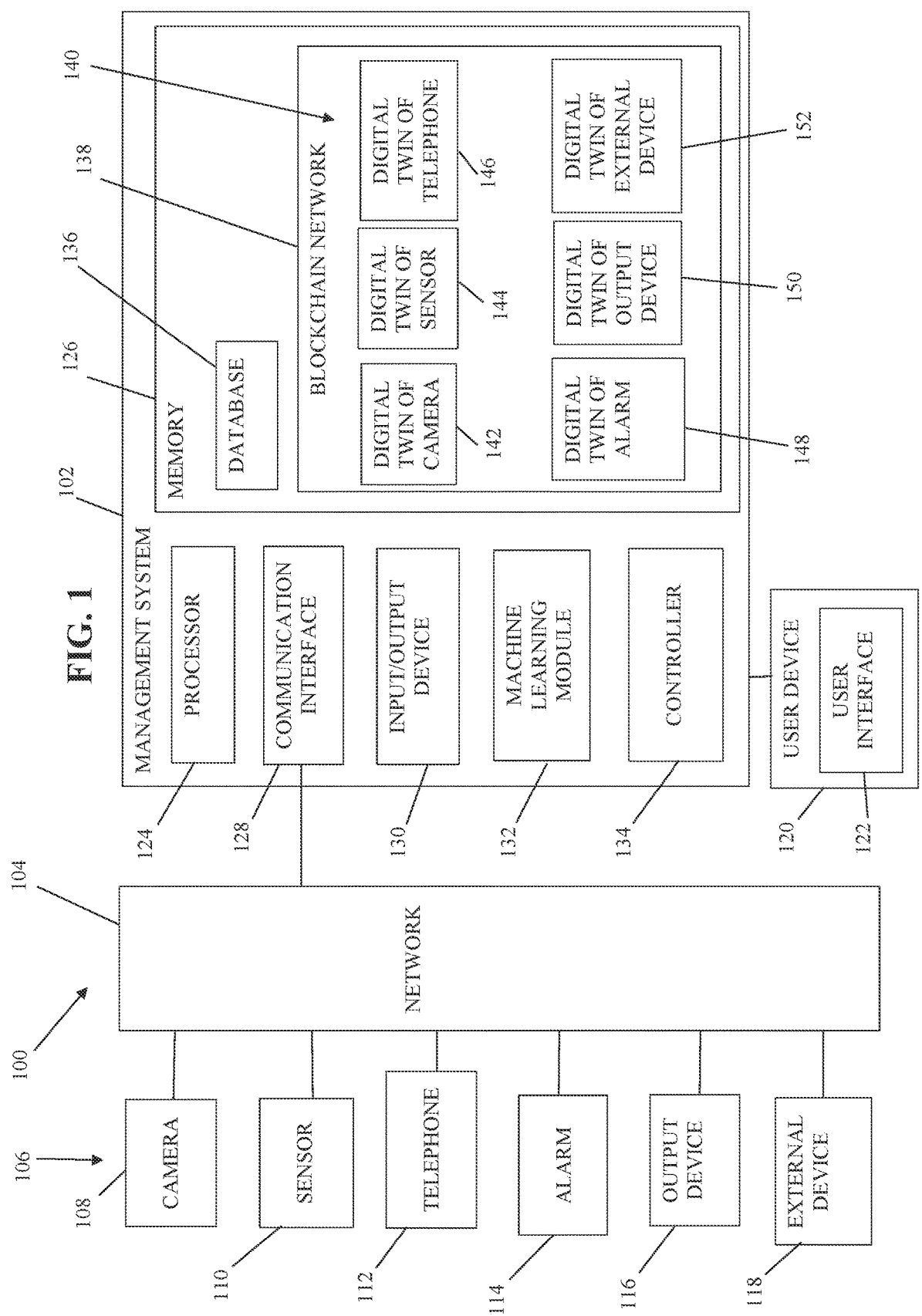
FIG. 1 is a schematic of a system, according to an embodiment.

As shown in FIG. 1, the system 100 includes a management system 102 operatively connected to a network 104. In one embodiment, the network 104 is the Internet. In another embodiment, the network 104 is an internal network or intranet of at least one facility, such as a house or a building of an organization. In a further embodiment, the network 104 includes both the Internet and an intranet. In an alternative embodiment, the network 104 is any known network having a known network architecture and configuration. The network 104 is operatively connected to at least one device 106. The at least one device 106 is any known electronic device. In one embodiment, the at least one device 106 includes a computing device. In another embodiment, the at least one device 106 includes a smart device. For example, the at least one device 106 includes a camera 108, a sensor 110, a telephone 112, an alarm 114, an output device 116, or any device 118 external to the management system 102. The camera 108 is a still camera.

Alternatively, the camera 108 is a video camera. Still further, the camera 108 is a security camera with or without audio capabilities. In addition, the camera 108 is a magnetic resonance imaging (MRI) machine. Also, the camera 108 is an X-ray machine. Furthermore, the camera 108 is an ultrasound imaging machine. In other embodiments, the camera 108 is any known imaging device. The camera 108 generates and outputs data in the form of a visual signal corresponding to the captured images or video.

In one implementation consistent with the invention, the sensor 110 is a temperature sensor. Alternatively or in addition, the sensor 110 is an audio sensor configured to detect sounds. Alternatively or in addition, the sensor 110 is a humidity sensor. Furthermore, the sensor 110 can include or be a pressure sensor. In other implementations, the sensor 110 is any known sensing device configured to sense or detect sensory signals. The sensory signals include visual signals, heat signals, audio signals, olfactory signals, taste signals, tactile signals, or any known signals in an environment. The sensor 110 is configured to generate and output data in the form of a data signal corresponding to the detected sensory signals.

In one implementation consistent with the invention, the telephone 112 is a wireless telephone. The telephone 112 can be an Internet Protocol (IP) based telephone. Alternatively, the telephone 112 can be a cellphone. In addition, the telephone 112 can be a smartphone. Alternatively, the telephone 112 can be a wired telephone. Furthermore, the telephone 112 can be any known device configured to conduct telephonic communications. The telephone 112 includes a speaker. Optionally, the telephone 112 includes a camera. Still further, the telephone 112 can include a keyboard or keypad. Also, the telephone 112 in a given implementation can include a display screen. For instance, the display screen can be a liquid crystal display (LCD) screen. In a more particular implementation, the display screen includes a touchscreen. More generally, the telephone 112 includes any known components and features configured to perform or facilitate telephonic communications.

In one implementation consistent with the invention, the alarm 114 is a fire alarm. In the same or another implementation, the alarm 114 is a security alarm for a door or entry. Optionally, the alarm 114 is a sound alarm configured to generate a data signal upon detection of a sound. Alternatively or in addition, the alarm 114 is a motion detector. Furthermore, the alarm 114 can include a chemical detector. By way of example, the chemical detector can be a carbon monoxide alarm. More generally, the alarm 114 is any known alarm configured to generate a data signal upon detection of a predetermined trigger condition or a predetermined environmental condition.

In one implementation consistent with the invention, the output device 116 is a printer. Alternatively or in addition, the output device 116 comprises a display or monitor. In a more particular implementation, the output device 116 includes an audio speaker. More generally, the output device 116 is any known device configured to output sensory data or information. The sensory data can include visual information such as a hardcopy printout of information, a displayed alphanumeric information on a display screen, or a displayed graphic on a display screen.

The external device 118 can be any known device external to the management system 102. Accordingly, the external device 118 includes any of the camera 108, the sensor 110, the telephone 112, the alarm 114, and the output device 116. The management system 102 is configured to control the external device 118. In one implementation, the external device 118 is a vehicle. Using the management system 102, a user controls the vehicle, for example, to turn on the vehicle or to turn on the heat in the vehicle. In another implementation, the external device is a door or gate to a facility. Using the management system 102, a user controls the door or gate to open or close. Alternatively or in addition, the external device 118 is a network-accessible device in a house or a building of an organization. For example, the external device 118 is a coffee maker. Using the management system 102, a user controls the coffee maker to start brewing coffee. Still further, the external device 118 is located relatively remotely from the management system 102.

Each device 106 includes any known components configured to operate each device 106 as an Internet of Things (IoT) device. Each IoT device 106, such as the devices 108, 110, 112, 114, 116, 118, is operatively connected to the management system 102 through the network 104. Each IoT device 106 is configured to communicate to the management system 102 using at least one predetermined communication protocol. For a plurality of IoT devices 106, the IoT devices 106 can communicate with different communication protocols. An example communication protocol is the Hypertext Transfer Protocol (HTTP). Another example communication protocol is the File Transfer Protocol (FTP). A further example communication protocol is the Transmission Control Protocol (TCP). Alternatively, the system 100 uses any known communication protocol, including, among others Bluetooth, Z-wave, Zigbee, Matter, RFID, Wifi, Cellular, NFC and so on. The management system 102 and each IoT device 106 are configured to communicate with each other through the network 104. Such communications include transferring data to and from any IoT device 106, and providing control signals to control a respective IoT device 106.

The system 100 cooperates with a user device 120 operatively connected to the management system 102. In one implementation, the user device 120 is directly connected to the management system 102. For example, the user device 120 is operatively connected, directly or indirectly, to the communication interface 128 of the management system 102, as described below. In an alternative implementation, the user device 120 is connected to the management system 102 through the network 104. The user device 120 is a computing device configured to allow a user to interact with the management system 102 and the at least one IoT device 106. For example, the user device 120 is configured to receive and send data from and to the at least one IoT device 106, respectively, through the management system 102. Alternatively, the user device 120 is configured to control at least one particular IoT device 106 using control signals communicated to a particular IoT device 106. Such data transfers and control are described in greater detail below.

In one implementation consistent with the disclosure the user device 120 is a hardware-based computing device. For instance, the user device 120 can be a personal computer. In another implementation, the user device 120 is a workstation. In other implementations, the user device 120 comprises or can additionally include a laptop, a smartphone, or a tablet. Regardless of implementation choice, the user device 120 includes a user interface (UI) 122 configured to receive and send data from and to the user, respectively, as well as configured to receive control signals or commands from the user. For example, the user interface 122 includes a graphic user interface (GUI). More generally, the user interface 122 is any known interface configured to receive and send data from and to the user, respectively, as well as configured to receive control signals or commands from the user. The user interface 122 provides a user friendly configuration to interact with, monitor, and control the at least one IoT device 106.

The user device 120 in a typical implementation includes a display, a keyboard, a keypad, a mouse, a stylus, a touchscreen, or any known physical hardware components to receive and send data from and to the user, respectively, as well as being configured to receive control signals or commands from the user. In a more particular implementation, a GUI-based user interface 122 displays actuatable icons, input fields, pull-down menus, buttons, or any known graphic elements and features to receive and send data from and to the user, respectively, as well as to receive control signals or commands from the user. The GUI-based user interface 122 can be configured to display graphical information with regard to each IoT device 106, such as a name or designation of the IoT device 106, a graphical representation of the IoT device 106, and alphanumeric or graphical information describing a characteristic of the IoT device 106. The characteristic includes a state or a behavior of the IoT device 106.

As shown in FIG. 1, the management system 102 includes a processor 124, a memory 126, a communication interface 128, an input/output device 130, a machine learning (ML) module 132, and a controller 134. In one implementation, the management system 102 is a programmed module including code executable by the processor 124. In another implementation, the management system 102 is a machine. For example, the machine implementing the management system 102 is a server. The server can be a central server of the at least one device 106. More generally, the management system 102 and the at least one device 106 has any known network architecture.

In the management system 102, the processor 124 is a hardware-based processor. The memory 126 is configured to store instructions and configured to provide the instructions to the hardware-based processor 124. Execution of such instructions implements modules, subroutines, and applications to perform various operations. For example, the processor 124 includes an update module configured to update digital twins 140 to represent an updated or changed state or behavior of corresponding devices 106, as described below. The communication interface 128 is operatively connected to the network 104. The input/output device 130 can be any known computing device, as described herein, configured to receive and send data from and to the user, respectively, as well as to receive control signals or commands from the user. In one implementation, the user of the input/output device 130 is a system administrator. The system administrator, using the input/output device 130, configures the management system 102 to operate by selecting at least one setting or operating parameter of the management system 102.

The machine learning module 132 is configured to implement the instructions provided to the hardware-based processor 124 to perform machine learning in conjunction with managing the at least one IoT device 106. The machine learning module 132 is configured to learn to perform predetermined functions, and is also configured to implements artificial intelligence (AI). In one implementation consistent with the disclosure, the machine learning module 132 implements a support vector machine (SVM). In the same or another implementation, the machine learning module 132 includes a neural network including a plurality of node or artificial neurons arranged in a plurality of layers. The neural network is any known neural network, such as a convolutional neural network (CNN). The neural network is trained using a predetermined training set to analyze data generated by the at least one IoT device 106 as an IoT device. For example, the predetermined training set includes previously generated data from at least one IoT device 106. The predetermined training set includes a characteristic of the at least one IoT device 106. The characteristic includes a state of the at least one IoT device 106. The characteristic also includes a behavior of the at least one IoT device 106.

The predetermined training set includes examples of normal states and behaviors of the at least one IoT device 106. The predetermined training set also includes unauthorized states and unauthorized behaviors of the at least one IoT device 106, as well as anomalous states and anomalous behaviors of the at least one IoT device 106. In one implementation, the memory 126 stores the predetermined training set.

Once trained, the machine language module 132 is configured to detect an unauthorized or anomalous state, or an unauthorized or anomalous behavior of the IoT device 106 by analyzing the state or behavior of the corresponding digital twin 140. For example, an unauthorized state or behavior or an anomalous state or behavior includes unauthorized communication of an IoT device 106 with other endpoints in the network 104, a situation in which an IoT device 106 starts scanning the network 104 or other devices connected to the network 104, a firmware update outside an authorized update time window, connections to suspicious internal or external IP addresses, and an unauthorized change in device configuration. In one implementation consistent with the disclosure, the system 100 or components of the system 100 are configured to operate in accordance with a predetermined specification, including predetermined parameters and behaviors. In the implementation of the system 100, for example, the management system 102 stores the predetermined specification in the memory 126, and the processor 124 operates to implement and enforce the predetermined specification. For example, firmware updates are allowed in a predetermined window from 7 AM to 9 AM, and so any change or update to the firmware after that predetermined window is flagged by the processor 124 as suspicious.

In one implementation consistent with the disclosure, a predetermined function of the trained machine learning module 132 includes analyzing the states and behaviors of each digital twin 140 to detect any unauthorized or anomalous states or behaviors of the corresponding IoT device 106, using suitably configured code executing in the processor 124. The machine learning module 132 is configured by code to classify the states or behaviors as unauthorized or anomalous. For example, in the case that the alarm 114 is activated at an unexpected or abnormal time period, the machine learning module 132 classifies the activation as an anomaly. If the alarm 114 is a security alarm for a door or entry to a facility during off hours, the machine learning module 132 classifies activation of the security alarm as an anomaly. In response to such classification, the machine learning module 132 is further configured by code to generate a notification to a user of the unauthorized or anomalous states or behaviors. For example, the user interface 122 outputs the notification to the user monitoring the alarm 114. The notification can be a visual message or an audio message warning the user of the security alarm being activated.

The controller 134 is configured to control the at least one IoT device 106. For example, as described above, in response to inputs or commands from a user entered through the user interface 122 of the user device 120. The controller 134 generates and outputs a control signal corresponding to the inputs or commands. In the examples above for the IoT devices 106, the user controls the controller 134 to, in turn, generate and transmit a control signal through the network 104 to control the at least one IoT device 106. As examples, the control signal from the controller 134 instructs a vehicle to turn on the vehicle or to turn on the heat in the vehicle, instructs a door or gate to a facility to open or close, or instructs the coffee maker to start brewing coffee. Similarly, the controller 134, responsive to the user inputs and commands, controls the camera 108 to capture an image, controls the sensor 110 to provide to the user a currently detected characteristic such as the temperature, controls the telephone 112 to dial a telephone number, controls the alarm 114 such as a house security alarm to activate, or controls the output device 116 to output information such as a hardcopy printout from a printer as the output device 116.

In an implementation of the system 100, the management system 102 performs an action in relation to a digital twin 140 or the corresponding device 106. In one example, the action includes monitoring the digital twin 140 using the user interface 122 or controlling the device 106 using the controller 134. In another example, the action includes generating reports, configuring devices 106, interfacing with devices 106, and other operations to manage the devices 106.

The memory 126 includes a database 136 and a blockchain network 138. The database 136 is configured to store settings and system configurations of the management system 102. Using the input/output device 130, the system administrator selects and stores at least one setting or operating parameter of the management system 102 in the database 136. In one implementation consistent with the disclosure, the management system 102 operates as a central server of the at least one device 106 as an IoT device in an IoT configuration. The memory 126 also stores a current state reflecting each IoT device 106 as well as the behavior of each IoT device 106. For example, the current states and behaviors of each IoT device 106 is stored in the database 136.

The blockchain network 138 stores the at least one digital twin 140 corresponding to the at least one IoT device 106. As described herein, a digital twin is a digital, electronic, or virtual model of an intended or actual real-world physical product, system, or process, which is the physical twin of the corresponding digital twin. The digital twin serves as an effectively indistinguishable digital counterpart of the real world physical product, system, or process for many practical purposes, such as simulation, integration, testing, monitoring, and maintenance. Digital twin technology involves creating a virtual replica of a physical object or system, which can then be used to monitor and manage the real world counterpart. In the context of IoT devices, digital twin technology is used to create virtual representations of individual devices or entire IoT networks. Such virtual representations are then used to monitor and manage the corresponding physical devices, allowing for effective and efficient management of the IoT ecosystem. Digital twin technology can be particularly useful in managing large scale IoT deployments in which it may be difficult or impractical to monitor individual devices in real-time. By creating a virtual representation of the IoT network, operators can monitor the devices and the network as a whole, identifying potential issues or areas for optimization.

The management system 102 uses known digital twin technology to create a digital twin 140 for each IoT device 106. For example, in a more particular implementation, the management system 102 uses a predetermined digital twin building software or application, stored in the memory 126 and executed by the processor 124 to build a digital twin. One example application is ANSYS TWIN BUILDER. Using a specification of each IoT device 106, such as the name, function, specific characteristics, operating parameters, operating commands, etc., the predetermined digital twin software creates a digital twin for the respective device. Alternatively or in addition, a system administrator or digital twin building personnel uses the input/output device 130 to enter inputs and commands to the predetermined digital twin software to create a digital twin 140 for each IoT device 106.

As shown in FIG. 1, the blockchain network 138 stores a digital twin 142 created for and corresponding to the camera 108, a digital twin 144 created for and corresponding to the sensor 110, a digital twin 146 created for and corresponding to the telephone 112, a digital twin 148 created for and corresponding to the alarm 114, a digital twin 150 created for and corresponding to the output device 116, and a digital twin 152 created for and corresponding to the external device 118. The management system 102 communicates with each of the IoT devices 106, receiving state data and behavior data from each of the IoT devices 106, and records all changes in states or behavior of a particular device by updating the digital twin corresponding to the particular device. In one implementation, the memory 126 storage data reflecting the changes in the states or behavior of each IoT device 106, and the processor 124 updates the digital twin 140 in the blockchain network 138 corresponding to each IoT device 106. In an alternative implementation, the blockchain network 138 updates each digital twin 140 corresponding to the IoT device 106 having the change of state or behavior.

In one implementation, each digital twin 140 is stored in the blockchain network 138 as a smart contract. As a smart contract, each digital twin 140 is configured to automatically execute, control, or document events and actions involving the corresponding at least one IoT device 106 according to the terms of a predetermined specification. In such an implementation, the predetermined specification is a contract or an agreement determining the operations of each IoT device 106. For example, in the case that the output device 116 is a television, the digital twin 152 corresponding to the television can have a smart contract specifying blocked channels unavailable for viewing by children according to predetermined parental controls. Such parental controls can be input by a parent using the user interface 122 of the user device 120. Accordingly, the management system 102 is then configured to implement the inputted parental controls in the digital twin 152 corresponding to the television, and the digital twin 152 automates the control of the television as the corresponding output device 116. In addition, each digital twin 140, at least when implementing a smart contract, performs other functions and operations, such as device authentication and data transmission, further improving the efficiency and security of the system 100.

Figure 2:
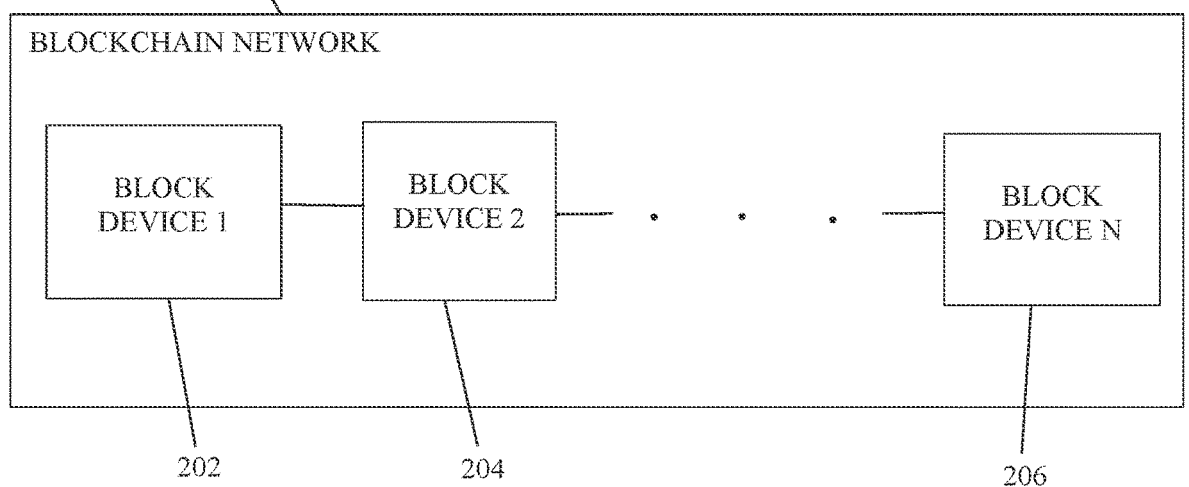
FIG. 2 is a schematic of a blockchain network used in the system of FIG. 1.

Referring to FIG. 2, the blockchain network 138 includes a plurality of block devices 202, 204, 206 configured in a blockchain and implementing known blockchain technology. The block devices 202, 204, 206 are operatively connected in a blockchain configuration, as shown in FIG. 2. In one implementation, each block device 202, 204, 206 is a memory device, such as a database. In the same or a different implementation, each block device 202, 204, 206 is a server. More generally, each block device 202, 204, 206 includes any known blockchain components to implement the blockchain. Accordingly, the blockchain network 138 implements a distributed and immutable ledger with growing lists of records, stored in the block devices 202, 204, 206. The block devices 202, 204, 206 are securely linked together via a cryptographic operation. For example, the cryptographic operation is a hash function. Each block device 202, 204, 206 includes a cryptographic hash of the previous block device, a timestamp, and transaction data. As described below, the digital twins 140 are stored in the block devices 202, 204, 206 of the blockchain network 138. With the blockchain network 138, the management system 102 creates and maintains a transparent and auditable record of the state and behavior of the IoT devices 106 through recording of such states and behaviors in the corresponding digital twins 140. Such transparent records improve the traceability and accountability of the system 100, and facilitate the identification and resolution of any issues or problems that may arise with the IoT devices.

Using the blockchain network 138, the system 100 is configured to implement secure communication and data transmission between the IoT devices 106 and the management system 102 or other control systems. In addition, by using the blockchain network 138 with such cryptographic hash functions, the management system 102 implements a secure and tamperproof record of all data transmission and interactions between the IoT devices 106 and other systems. Alternatively, the processor 124 or the communication interface 128 use known security technology to establish a secure communication channel between the management system 102 and each IoT device 106. For example, the processor 124 or the communication interface 128 use encryption or anonymization for communications with the IoT devices 106.

With such a secure communication channel and secure IoT data transmissions, as well as the use of the digital twins 140 and the blockchain network 138, the management system 102 verifies the identity and authenticity of the IoT devices 106. Accordingly, a user can be confident that the generated digital twins 140 of the IoT devices 106 are accurate representations of the states and behavior of each IoT device 106, and such digital twins 140 have not been tampered with. This can be particularly important in applications in which the IoT devices 106 are responsible for critical functions or in situations in which the data generated by the IoT devices 106 is sensitive or valuable, such as in healthcare or financial services.

In an alternative implementation, the management system 102 has the blockchain network 138 implemented as a decentralized system configured to manage the diverse IoT devices 106. In a decentralized system, there is no single point of failure or control, which can increase the security and reliability of the IoT network of IoT devices 106. Advantageously, each IoT device 106 is assigned its own unique identity on the blockchain in the blockchain network 138, which can be used to track the location, status, and other important information associated with a particular IoT device 106.

Figure 3:
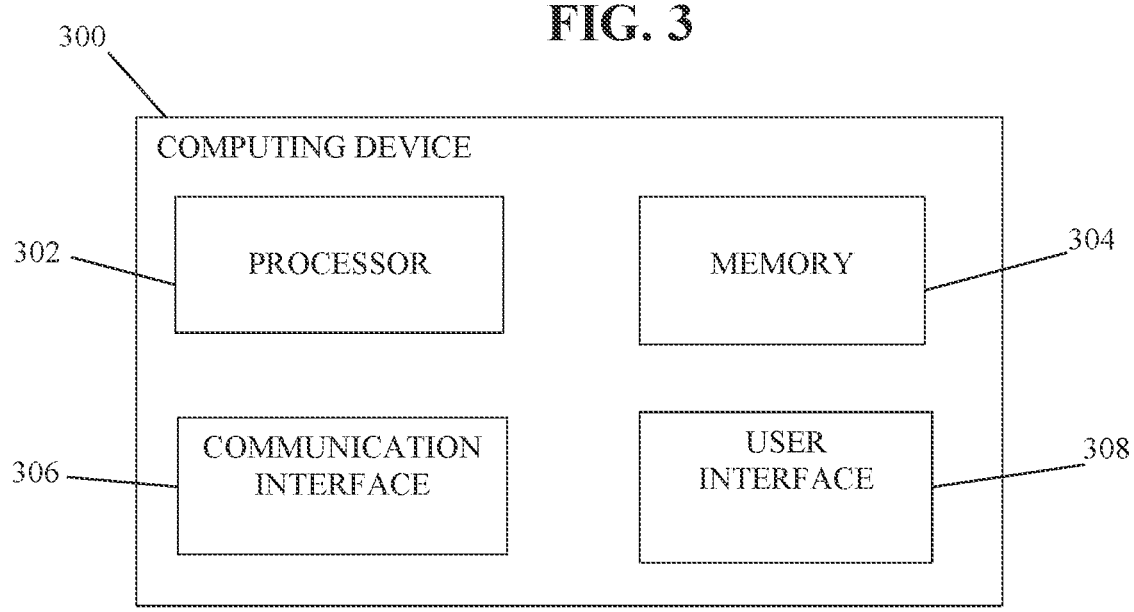
FIG. 3 is a schematic of a computing device used in the embodiment.

FIG. 3 illustrates a schematic of a computing device 300 including a processor 302 having code therein, a memory 304, and a communication interface 306. Optionally, the computing device 300 can include a user interface 308, such as an input device, an output device, or an input/output device. The processor 302, the memory 304, the communication interface 306, and the user interface 308 are operatively connected to each other via any known connections, such as a system bus, a network, etc. Any component, combination of components, and modules of the system 100 and blockchain network 200 in FIGS. 1-2, respectively, can be implemented by a respective computing device 300. For example, each of the components shown in FIGS. 1-2 can be implemented by a respective computing device 300 shown in FIG. 3 and described below.

It is to be understood that the computing device 300 can include different components. Alternatively, the computing device 300 can include additional components than illustrated in FIG. 3. In a more particular implementation, some or all of the functions of a given component can instead be carried out by one or more different components. The computing device 300 can be implemented by a virtual computing device. Alternatively or in addition, the computing device 300 can be implemented by one or more computing resources in a cloud computing environment. Additionally, the computing device 300 can be implemented by a plurality of any known computing devices.

The processor 302 can be a hardware-based processor implementing a system, a sub-system, or a module. The processor 302 can include one or more general-purpose processors. Alternatively, the processor 302 can include one or more special-purpose processors. The processor 302 can be integrated in whole or in part with the memory 304, the communication interface 306, and the user interface 308. In another alternative embodiment, the processor 302 can be implemented by any known hardware-based processing device such as a controller, an integrated circuit, a microchip, a central processing unit (CPU), a microprocessor, a system on a chip (SoC), a field-programmable gate array (FPGA), or an application-specific integrated circuit (ASIC). In addition, the processor 302 can include a plurality of processing elements configured to perform parallel processing. In a further alternative embodiment, the processor 302 can include a plurality of nodes or artificial neurons configured as an artificial neural network. The processor 302 can be configured to implement any known artificial neural network, including a convolutional neural network (CNN).

The memory 304 can be implemented as a non-transitory computer-readable storage medium such as a hard drive, a solid-state drive, an erasable programmable read-only memory (EPROM), a universal serial bus (USB) storage device, a floppy disk, a compact disc read-only memory (CD-ROM) disk, a digital versatile disc (DVD), cloud-based storage, or any known non-volatile storage.

The code of the processor 302 can be stored in a memory internal to the processor 302. The code can be instructions implemented in hardware. Alternatively, the code can be instructions implemented in software. The instructions can be machine-language instructions executable by the processor 302 to cause the computing device 300 to perform the functions of the computing device 300 described herein. Alternatively or in addition, the instructions can include script instructions executable by a script interpreter configured to cause the processor 302 and computing device 300 to execute the instructions specified in the script instructions. In a more particular implementation, the instructions are executable by the processor 302 to cause the computing device 300 to execute an artificial neural network. The processor 302 can be implemented using hardware or software, such as the code. The processor 302 can implement a system, a sub-system, or a module, as described herein.

The memory 304 can store data in any known format, such as databases, data structures, data lakes, or network parameters of a neural network. The data can be stored in a table, a flat file, data in a filesystem, a heap file, a B+ tree, a hash table, or a hash bucket. The memory 304 can be implemented by any known memory, including random access memory (RAM), cache memory, register memory, or any other known memory device configured to store instructions or data for rapid access by the processor 302, including storage of instructions during execution.

The communication interface 306 can be any known device configured to perform the communication interface functions of the computing device 300 described herein. The communication interface 306 can implement wired communication between the computing device 300 and another entity. Alternatively, the communication interface 306 can implement wireless communication between the computing device 300 and another entity. The communication interface 306 can be implemented by an Ethernet, Wi-Fi, Bluetooth, or USB interface. The communication interface 306 can transmit and receive data over a network and to other devices using any known communication link or communication protocol.

The user interface 308 can be any known device configured to perform user input and output functions. The user interface 308 can be configured to receive an input from a user. Alternatively or in addition, the user interface 308 can be configured to output information to the user. The user interface 308 can comprise a computer monitor, a television, a loudspeaker, a computer speaker, or any other known device operatively connected to the computing device 300 and configured to output information to the user. A user input can be received through the user interface 308 implementing a keyboard, a mouse, or any other known device operatively connected to the computing device 300 to input information from the user. Alternatively or in addition, the user interface 308 can be implemented by any known touchscreen. The computing device 300 can include a server, a personal computer, a laptop, a smartphone, or a tablet.

Referring to FIG. 4, a computer-implemented method 400 of operation of the system 100 includes operating the system and the various connections, components and modules on order to perform the steps illustrated, including creating a digital twin 140 corresponding to an IoT device 106 in step 402, storing the digital twin 140 in a blockchain in step 404, receiving information corresponding to a change in the state or behavior of the IoT device 106 over a secure communication channel in step 406, updating the corresponding digital twin 140 with the information on the change in the state or behavior in step 408, monitoring the digital twin 140 using a user interface 122 in step 410, receiving a control input from a user through the user interface 122 in step 412, and controlling the IoT device 106 over the secure communication channel using a controller 134 in step 414.

Referring to FIG. 5, a computer-implemented method 500 of monitoring the IoT devices 106 is performed concurrently with the method 400 of FIG. 4. In one more particular implementation, the method 500 is performed during step 410 of the method 400, in which a user monitors at least one of the IoT devices 106 by monitoring at least one digital twin 140 corresponding to the at least one of the IoT devices 106 of interest to the user. The method 500 of monitoring includes training a machine learning module 132 using a training set in step 502, analyzing the state or behavior of the digital twin 140 using the trained machine learning module 132 in step 504, detecting an unauthorized or anomalous state or behavior of the digital twin 140 in step 506, generating a notification of the unauthorized or anomalous state or behavior in step 508, and outputting the notification to the user though the user interface 122 in step 510.

The management system 102 facilities monitoring the state and behavior of the IoT devices 106 by a user through monitoring the corresponding digital twins 140. In a particular implementation, the state and behavior of each IoT device 106 is obtained in real-time or near real-time by the management system 102, and so the corresponding digital twins 140 are updated in real-time or near real-time by the management system 102. For example, the processor 124 can be configured to regularly poll or check each of the IoT devices 106 for the respective states and behaviors of the IoT devices 106, and receive updated state and behavior data from the IoT devices 106. The processor 124 then updates the corresponding digital twins 140 using the updated state and behavior data. For example, the processor 124 instructs the blockchain network 138 to update the corresponding digital twins 140 with the updated state and behavior data.

Using the user interface 122, a user can query the management system 102 for the state and behavior of a particular digital twin 140 to monitor in real-time the actual state and behavior of the corresponding IoT device 106. Further using the user interface 122, the user can then control the corresponding IoT device 106 by entering inputs and commands through the user interface 122. The controller 134 then generates a control signal corresponding to the inputs and commands, and outputs the control signal to the corresponding IoT device 106 through the network 104. Upon receipt of the control signal, the corresponding IoT device 106 implements a change of state or behavior corresponding to the user-entered inputs and commands. Accordingly, the management system 102 facilitates the monitoring and control of any of the IoT device 106 by the user through the user device 120 monitoring the corresponding digital twin 140 and entering inputs and commands for processing by the controller 134.

In additional embodiments, the system 100 implements edge computing technology to process data closer to the source, improving the speed and efficiency of data processing. The system 100 is also scalable to further enhance the effectiveness and usability of the system 100. The system 100 provides a flexible and secure solution for managing multiple IoT devices 106, with application in a variety of industries including home automation, automation of industrial machinery such as hoes and drills, industrial control, healthcare, transportation, and more. With its wide range of features and capabilities, the system 100 is well-suited for managing multiple IoT devices 106 in a rapidly evolving and increasingly complex technological landscape, and the system can help to meet the growing need for effective and secure methods of connecting and managing multiple IoT devices 106.

Portions of the methods described herein can be performed by software or firmware in machine readable form on a tangible or non-transitory storage medium. For example, the software or firmware can be in the form of a computer program including computer program code adapted to cause the system to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A system, comprising:
   a controller;
   a communication interface operatively connected to a user device associated with a user and having a user interface, the communication interface being operatively connected to an electronic device through a network and configured to establish a secure communication channel between the controller and the electronic device, wherein the electronic device is associated with a first characteristic;
   a hardware-based processor;
   a memory configured to store instructions and configured to provide the instructions to the hardware-based processor, wherein the memory includes:
      a blockchain network having a plurality of block devices storing, in a blockchain, a digital twin corresponding to the electronic device, wherein the digital twin includes the first characteristic; and
   a set of modules configured to implement the instructions provided to the hardware-based processor, the set of modules including:
      an update module configured to receive an updated characteristic associated with the electronic device, and to update the digital twin corresponding to the electronic device to include the updated characteristic; and an analysis module configured to detect, from the first characteristic or the updated characteristic, an unauthorized or anomalous behavior of the digital twin corresponding to a detected unauthorized or anomalous behavior of the electronic device, wherein the user device is configured to output a notification to the user indicating the detected unauthorized or anomalous behavior of the electronic device, wherein the hardware-based processor, responsive to a user input received from the user through the user interface, performs an action in relation to the digital twin or the corresponding electronic device through the secure communication channel using the controller, and wherein the action includes managing the electronic device based on the detected unauthorized or anomalous behavior of the electronic device.

2. The system of claim 1, wherein at least one of the first characteristic and the updated characteristic is a state or a behavior of the electronic device.

3. The system of claim 2, wherein the digital twin represents the state or behavior of the electronic device.

4. The system of claim 1, wherein the action is a monitoring of the digital twin or a controlling of the electronic device by the controller through the secure communication channel.

5. The system of claim 1, wherein the electronic device is an Internet of Things (IoT) device.

6. The system of claim 1, wherein the digital twin includes a smart contract operating in relation to the electronic device.

7. The system of claim 1, wherein the analysis module includes a machine learning module trained by a predetermined training set and, after training, configured to detect the unauthorized or anomalous behavior of the electronic device from the first characteristic or the updated characteristic.

8. A system, comprising:
an electronic device associated with a first characteristic including a first state or a first behavior of the electronic device;
a user device associated with a user and including a user interface;
a network;
a management module including:
a controller;
a communication interface operatively connected to the electronic device and the user device through the network and configured to establish a secure communication channel between the controller and the electronic device;
a hardware-based processor;
a memory configured to store instructions and configured to provide the instructions to the hardware-based processor, wherein the memory includes:
a blockchain network having a plurality of block devices storing, in a blockchain, a digital twin corresponding to the electronic device, wherein the digital twin includes the first characteristic; and
a set of modules configured to implement the instructions provided to the hardware-based processor, the set of modules including:
an update module configured to receive an updated characteristic, including an updated state or an updated behavior, and associated with the electronic device, and to update the digital twin corresponding to the electronic device to include the updated characteristic; and an analysis module configured to detect, from the first characteristic or the updated characteristic, an unauthorized or anomalous behavior of the digital twin corresponding to a detected unauthorized or anomalous behavior of the electronic device, wherein the user device is configured to output a notification to the user indicating the detected unauthorized or anomalous behavior of the electronic device, wherein the hardware-based processor, responsive to a user input received from the user through the user interface, performs an action in relation to the digital twin or the corresponding electronic device through the secure communication channel using the controller, and wherein the action includes managing the electronic device based on the detected unauthorized or anomalous behavior of the electronic device.

9. The system of claim 8, wherein the digital twin represents the first or updated state or the first or updated behavior of the electronic device.

10. The system of claim 8, wherein the action is a monitoring of the digital twin or a controlling of the electronic device by the controller through the secure communication channel.

11. The system of claim 8, wherein the network includes the Internet, and
wherein the electronic device is an Internet of Things (IoT) device.

12. The system of claim 8, wherein the digital twin includes a smart contract operating in relation to the electronic device.

13. The system of claim 8, wherein the analysis module includes a machine learning module trained by a predetermined training set and, after training, configured to detect the unauthorized or anomalous behavior of the electronic device from the first characteristic or the updated characteristic.

14. A computer-implemented method, comprising the steps of:
providing a machine including a controller and a communication interface configured to establish a secure communication channel between the controller and an electronic device, wherein the communication interface is operatively connected to a user device associated with a user and having a user interface;
creating a digital twin of the electronic device within a memory of the machine;
storing the digital twin in a blockchain;
receiving, at the machine, information of a change of a first characteristic of the electronic device;
updating the digital twin within the memory with the received information;
detecting, from the updated digital twin, an unauthorized or anomalous behavior of the digital twin corresponding to a detected unauthorized or anomalous behavior of the electronic device;
generating a notification to the user of the detected unauthorized or anomalous behavior;
outputting the notification to the user through the user interface; and
performing an action in relation to the digital twin or the corresponding electronic device through the secure communication channel using the controller, wherein the action includes managing the electronic device based on the detected unauthorized or anomalous behavior of the electronic device.

15. The method of claim 14, wherein performing the action includes:
monitoring the digital twin using the user interface of the user device.

16. The method of claim 14, wherein performing the action includes:
receiving a control input from the user through the user interface of the user device; and
responsive to the control input, controlling the electronic device.

17. The method of claim 14, wherein the electronic device is an Internet of Things device.

18. The method of claim 14, further comprising:
training a machine learning module using a predetermined training set, thereby configuring the trained machine learning module to
analyze the digital twin for the unauthorized or anomalous behavior of the digital twin,
wherein the detecting includes using the trained machine learning module to detect the unauthorized or anomalous behavior of the digital twin corresponding to the detected unauthorized or anomalous behavior of the electronic device.

* * * * *